Feb. 20, 1968  A. FENER  3,369,954

HEAT SEALING MACHINE AND SEALING MEMBER THEREFOR

Filed Nov. 12, 1964  3 Sheets-Sheet 1

INVENTOR
ALFRED FENER
BY
ATTORNEY

Feb. 20, 1968    A. FENER    3,369,954
HEAT SEALING MACHINE AND SEALING MEMBER THEREFOR
Filed Nov. 12, 1964    3 Sheets-Sheet 2
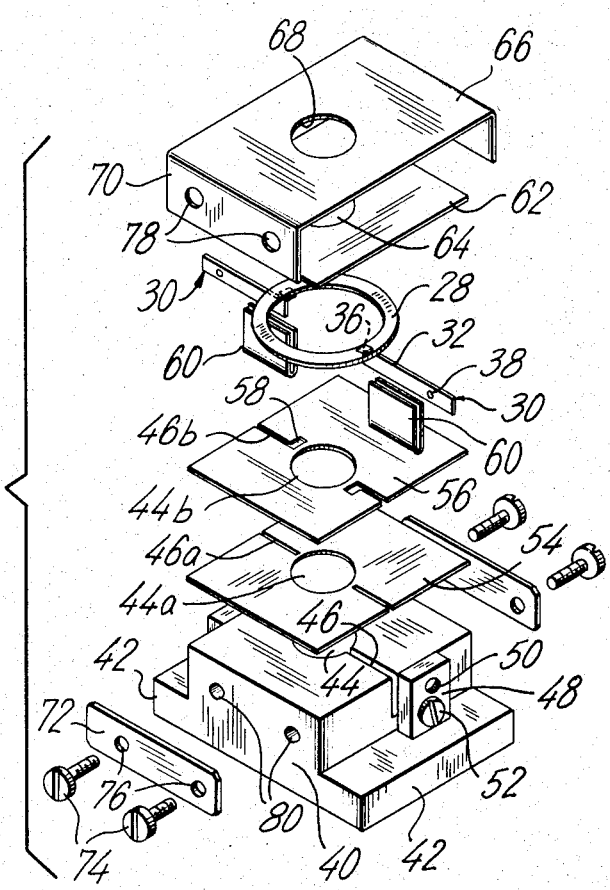
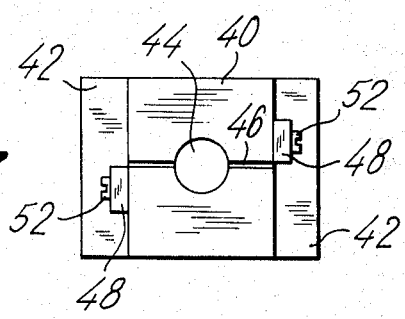
INVENTOR
*ALFRED FENER*
BY
ATTORNEY Feb. 20, 1968  A. FENER  3,369,954
HEAT SEALING MACHINE AND SEALING MEMBER THEREFOR
Filed Nov. 12, 1964  3 Sheets-Sheet 3

INVENTOR
ALFRED FENER
BY
ATTORNEY

United States Patent Office 3,369,954
Patented Feb. 20, 1968

3,369,954
HEAT SEALING MACHINE AND SEALING MEMBER THEREFOR
Alfred Fener, 2037 Utica Ave., Brooklyn, N.Y. 11234
Filed Nov. 12, 1964, Ser. No. 410,585
10 Claims. (Cl. 156—583)

ABSTRACT OF THE DISCLOSURE

In a sealing member for heat sealing machines, a heater element in the form of a sheet washer, a pair of feeders having one of their ends attached to the bottom face of said heater element at diametrically opposite transverse regions thereof, and a conductor attached to each of the other ends of said feeders for supplying impulses of heating current through said feeders to said heater element. The specific resistivities of the said washer, feeders and conductors, respectively, are so selected as to obtain uniform distribution of heat over the sealing face of the washer.

---

This invention relates to the art of heat sealing thermoplastic sheets or films and, more particularly, to a heat sealing machine of novel and improved character capable of forming heat seals of closed geometric shapes.

In Langer Patent 2,460,460, there is disclosed a heat sealing machine wherein the sealing heat is generated in a heater element in the form of a thin strip or band of metal having high specific resistivity by passing a short pulse of electric current therethrough. This metal strip or band is tensioned between two terminals over a suitable base of which at least the top surface is formed of a heat-resistant insulating material. As the heater element expands to a substantial extent during the passage of heater current therethrough, it is desirable to provide means for placing the said element under tension, thereby to avoid buckling and deformation thereof. A heater element of this type heats up to sealing temperature practically instantaneously upon the passage of a pulse of current therethrough, thus causing heat sealing or welding of the thermoplastic layers against which it is applied. Preferably, pressure is maintained upon the layers for a short period after the end of the sealing pulse of current to permit the seal to cool and to consolidate under pressure whereby a very satisfactory seal is obtained.

Although sealing machines of the described character, generally called thermal impulse sealers, were quite successful on a practical and industrial scale for the production of straight line or rectilinear seals, serious difficulties were experienced when it was desired to produce seals of a closed geometric shape, such as of a circular, or annular shape. The most important of these difficulties consisted in the practical impossibility of obtaining a uniform distribution of heat in the heater element of annular shape so that hot spots and/or cold spots, i.e. areas of excessively high or low temperature, would develop in the heater element. This, of course, resulted in a corresponding deformation or distortion of the pattern of heat seal produced, which, instead of having the shape of an annular band of uniform width, became of a distorted oval shape with considerable variations in its width. Although various suggestions and proposals were made to solve the outstanding problem, none, as far as I am aware, of these suggestions and proposals was completely satisfactory and successful. This constituted a serious problem in the heat sealing art, since there are many instances where a heat seal of accurate annular shape is required, for example, when it is desired to heat seal a tubular member or spout to a container or bag of thermoplastic material.

I have discovered that the outstanding problem may be solved in a remarkably simple manner.

It is an object of the present invention to improve heat sealing machines of the thermal impulse type.

It is another object of the present invention to provide a novel and improved heat sealing machine of the thermal impulse type capable of producing seals having closed geometric shapes, such as of a circular or annular shape, which accurately conform to a predetermined desired pattern.

It is a further object of the invention to provide an improved sealing member for thermal impulse sealers which is quickly and readily adaptable to the production of seals of closed geometric shapes in the absence of "hot" and "cold" spots.

The invention also contemplates a thermal impulse sealer for producing seals of accurate closed geometric shapes, which is simple in construction, reliable in operation, and which may be readily manufactured and sold on a practical and industrial scale at a low cost.

Other and further objects and advantages of the present invention will become apparent from the following description, taken in conjunction with the accompanying drawings, in which:

FIG. 6 is an exploded perspective view of a sealing member embodying the heater element shown in FIG. 5;

FIG. 7 is a top elevational view of the sealing member shown in FIG. 6;

In order that those skilled in the art may have a better understanding of the invention, it will be desirable first to explain the structure and mode of operation of conventional heater elements used for the production of seals of closed geometric shapes.

Figure 1:
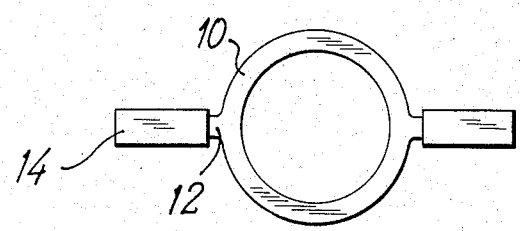
FIG. 1 is a top elevational view of a conventional circular heater element with outside lug feeders.

Referring now more particularly to FIG. 1 of the drawing, reference numeral 10 denotes a flat heater element of annular shape cut or punched from a thin sheet of metal of high specific resistivity, such as a suitable nickel-chromium alloy sold under the name Nichrome. At diametrically opposite points, the annular heater element is provided with integrally formed outwardly extending ears 12. To each of the said ears is secured, for example by brazing, a lug or feeder 14 of a metal of higher electrical conductivity, such as brass.

Figure 2:
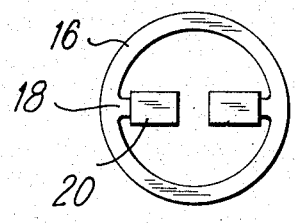
FIG. 2 is a similar view of a conventional circuit heater element with internal lug feeders.

A modified form of a conventional circular heater element is illustrated in FIG. 2. It comprises the circular heater element 16 cut from thin Nichrome sheet provided at diametrically opposite points with integrally formed inwardly extending ears 18. To each of the ears is brazed a brass lug or feeder 20.

It will be noted that the heater elements shown in FIGS.

Figure 3:
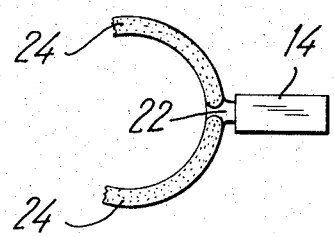
FIG. 3 is a fragmentary elevational view of a portion of the heater element shown in FIG. 1, indicating the development of "cold" spots in the heat seal or print produced during operation of the said element.
Figure 4:
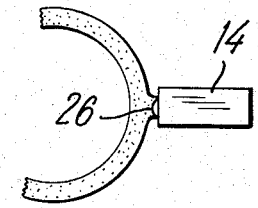
FIG. 4 is another fragmentary elevational view of a portion of the heater element shown in FIG. 1, indicating the development of "hot" spots in the heat seal or print produced during operation of the said element.

1 and 2 are practically identical in structure, except for the fact that in FIG. 1 the feeders extend outwardly, whereas in FIG. 2 they extent inwardly. In both cases, due to the symmetrical and balanced character of the circuit, it was reasonably expected that the annular heater element will be heated to a uniform temperature in its entirety and that upon being pressed against a pair of superposed sheets of thermoplastic materials, such sheets will be heat sealed together in an area accurately conforming to the annular shape of the heater element. Experience has demonstrated, however, that this was not the case. To the contrary, it was found that as the current divides from feeder 14 into the two branches of the balanced circuit of FIG. 1, it would follow the shortest path, thus crowding into a shape not conforming to the original geometric form. To this was added the heat withdrawal effect of ears 12, maintained at a lower temperature by feeders 14. As shown in FIG. 3, this resulted in an area or cold spot 22 opposite to each feeder which remained below the desired heat sealing temperature. When such heater element was energized by a pulse of sealing current and was pressed against a pair of superposed thermoplastic sheets, the sealing pattern or heat print 24 was non-uniform and discontinuous. Many attempts have been made to compensate for the above-mentioned imperfections in the sealing pattern, such as allowing brass feeder 14 to rise in temperature by making it thinner or narrower, or by cutting away the Nichrome at the junction of ear 12 and feeder 14, to allow it to overheat due to an increase in resistance in the said regions. Unfortunately, these expedients were unsuccessful in eliminating "cold" spots 22. As a matter of fact, when increasing the junction resistance between ears 12 and feeders 14, "hot" spot 26 (FIG. 4) would appear in the sealing pattern imprinted upon the thermoplastic sheets, which is just as undesirable as the production of "cold" spots. Thus, the prior art was unable to provide uniform current flow in the Nichrome band opposite to the junction of the said band with the feeder. In general, the difficulty was the greater, the larger was the width of the Nichrome band and the same difficulty was experienced when using the inside lug feeders 20 illustrated in FIG. 2.

Broadly stated, in accordance with the principles of my invention, the above-mentioned difficulties are completely eliminated by reorganizing the spatial relationship between the annular Nichrome band and its feeders. It will be noted that, in the conventional structures, the feeders were arranged at the inner or outer sides of the band and extended in the same plane, necessarily resulting in the production of a distorted or non-uniform current flow. I have discovered that when the current is introduced in two diametrically opposite transverse regions of the annular heater element or washer, instead of the lateral feed of the prior art, completely uniform heating of the entire surface of the element is obtained and the production of both "cold" and "hot" spots is avoided. The construction and assembly of the circular heater element of the invention will be best understood by reference to FIG. 5 of the drawing.

Figure 5:
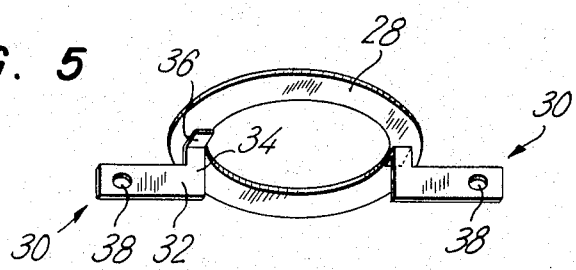
FIG. 5 is a perspective view of a heater element embodying the invention.

Referring now to FIG. 5, numeral 28 denotes the circular heater element or washer cut out from thin Nichrome sheet. At diametrically opposite transverse regions of said heater element are provided two feeders generally denoted by numerals 30, each having a main or body portion 32, a narrowed extension 34, both at right angles to the heater element, and an ear 36 bent into the plane of the heater element and brazed thereto. For best results, it is essential that the said feeders be formed of a metal the specific resistivity of which is lower than Nichrome, though higher than that of copper or brass. A copper base alloy containing zinc and nickel and known in the trade as German silver, has been found to be very suitable for this application. It is further to be noted that ears 36 should preferably be narrower than the Nichrome band and should be brazed to said band in such a position that their inner edge is coextensive with the inner edge, while their outer edge is spaced from the outer edge of the band. Experience has demonstrated that the reduced width of the feeder ears and their particular arrangement with respect to the heater element reduces undesirable heat withdrawal in the area of junction and the production of "cold" spots in the critical regions adjoining the inner edge of the heater element. A hole 38 is provided at the end of each feeder 30 for accommodating a terminal screw or bolt whereby the heater element may be connected to a source of sealing current.

It will be noted that by supplying the current in diametrically opposite transverse regions of the circular heater element, such current can flow equally at the inside diameter, as well as the outside diameter of the Nichrome ring. All that remains to be done is to make the leg of the feeder neutral, insofar as temperature effect is concerned, to cause the shape of the heat sealed region, or heat print, accurately conform to the shape of the Nichrome ring or washer. In other words, the thermal dissipation of the junction between extension or leg 34 and heater element 28 has to balance out its temperature rise. This condition is fullfilled by making the leg 34 of the feeders 30 narrower than the width of the heater element or washer. It has been found that in this manner feeders 30 are made "neutral" in respect of the temperature of the Nichrome washer, in other words, they have no heating or cooling effect on the portions of the washer with which they are connected. Also, as it has been pointed out in the foregoing, the inner edge of ears 36 of the feeders 30 is coextensive with the inner edge of the heater element which eliminates the presence of "cold" spots in that region while the fact that the said ears are narrower than the heater element eliminates the presence of "hot" spots at the outer edge of said heater element. In general, for good results, the width of ears 36 may be three-fourths of the width of the heater element, though the proportion is not critical and the optimum proportion can be readily determined by a few tests.

Assembly of the heater element of the invention into a practical and operative sealing member will be best understood from the exploded perspective view shown in FIG. 6. Numeral 40 denotes a base of metal of high heat conductivity, such as aluminum, having an integral shoulder 42 extending at each side thereof. A circular aperture 44 having a diameter somewhat smaller than the inner diameter of heater element 28 extends through the center of base and a thin slot 46 is provided in base 40, diametrically across aperture 44 but ending short of shoulders 42. A terminal block 48 of a suitable insulating material, such as Bakelite, is secured to each side of base 40 by means of a screw 50 and also carries a terminal screw 52 for establishing electrical connection to the two feeders 30 of the heater element.

On the top surface of base 40 is placed a piece of Teflon sheet 54 and is secured thereto by means of an adhesive coating on its underside. Sheet 54 is provided with a central aperture 44a and slots 46a aligned with aperture 44 and slots 46 in the base, except for the fact that slots 46a end short of the aperture. A second piece of Teflon sheet 56 is placed on top of first sheet 54 and is provided with an aperture 46b and slots 46b which are aligned with those of Teflon sheet 54. Each of slots 46b is provided with an enlargement 58 at its end which is in proximity to the aperture. These enlargements serve to accommodate ears 36 of feeders 30 spot welded to the underside of heater element 28. As the said heater element is identical with the one described in connection with FIG. 5 and similar reference numerals have been used to denote corresponding parts, its descripiton need not be repeated.

A piece of Teflon sheet 60 folded into the shape of a U is placed around each of feeders 32 of the heater element and then the said element is placed on top of Teflon sheet 56, with feeders 32 dropped into slots 46, 46a and 46b and insulated from the aluminum base by Teflon sheets 60. The ends of feeders 32, with apertures 38 therein extend beyond the said base and are bent in parallelism with the upper surface of terminal blocks 48 and are secured thereto by means of screws 52 extending through apertures 38 of the feeders into a threaded hole in the terminal blocks. Screws 52 thus constitute the electrical terminals of the heater element. To further secure the position of heater element against lateral displacement, the upper face of Teflon sheet 56 is coated with a suitable heat-resistant pressure-sensitive adhesive.

A third Teflon sheet 62 having a central aperture 64 therein is superposed upon the heater element and is covered with a fourth Teflon sheet 66 having an aperture 68 in its center. It will be noted that the apertures 44, 44a, 44b, 64 and 68 are aligned with each other. Lateral marginal portions 70 of Teflon sheet 66 are bent down against the sides of aluminum base 40 and the entire structure is securely held together by metal plates 72 pressed against the base by means of screws 74 extending through holes 76 of the said plates and through aligned holes 78 of Teflon sheet 66 into internally threaded holes 80 in base 40.

Figure 8:
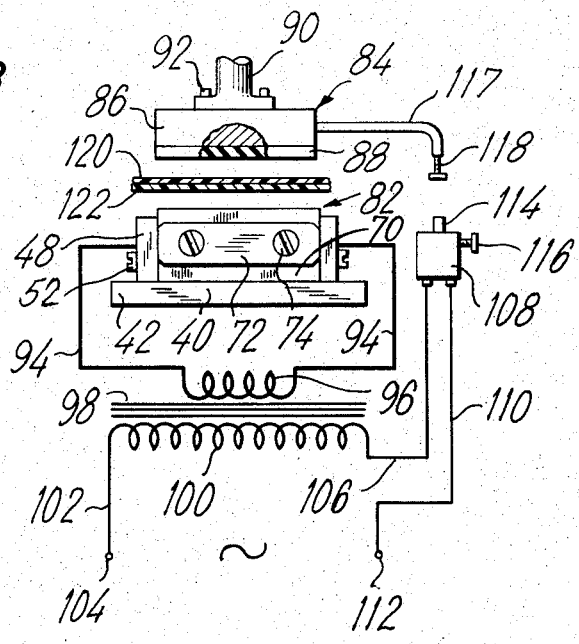
FIG. 8 is a side elevational view, somewhat diagrammatic in character and having parts in section, of a thermal impulse sealer having the heater element and sealing member of FIGS. 5 and 6 incorporated therein.

FIG. 8 illustrates the incorporation of the sealing member of the invention into a complete heat sealing machine. As the sealing member generally denoted by numeral 82 has been just described in great detail in connection with FIGS. 6 and 7, the said description will not be repeated, particularly as similar reference numerals have been used to denote corresponding parts.

Sealing member 82 is mounted in a stationary position and cooperates with a pressure member generally denoted by numeral 84 comprising a ragid base 86 of metal and an underlying layer 88 of a suitable elastomer, such as a suitable grade of silicone rubber. Pressure member 84 is arranged for reciprocation with respect to the sealing member by any suitable mechanism, for example, by means of an air cylinder (not shown) such mechanism being diagrammatically indicated by means of a support 90, attached to metal base 86 of the pressure member by means of screws 92.

Terminals 52 of the heater element are connected by lead wires 94 to the respective ends of secondary winding 96 of a step-down transformer 98. Primary winding 100 of the said transformer has one of its ends connected through lead wire 102 to one of the terminals, 104, of the alternating current power line while the other end of said winding is connected through lead wire 106, a time delay switch 108, and another lead wire 110 to the other terminal, 112, of the power line. Time delay switch 108 is provided with an operating plunger 114 and an adjustment screw 116, whereby the length of the time delay period may be regulated. The time delay switch may be of the pneumatic, magnetic or electronic type and its structure need not be described, particularly as switches of this type and suitable for the purposes of the invention are disclosed in Langer Patents 2,460,460 and 2,479,375. It will be sufficient to state that upon depression of operating plunger 114, the switch closes the circuit with which it is electrically associated and then automatically opens the circuit a predetermined period thereafter, depending upon adjustment of screw 116. An L-shaped actuating rod 117 has the end of its horizontal portion fixed in base 86 of the pressure member and its vertically depending end carries a screw 118 which will strike against operating plunger 114 of the time delay switch sometime during the downward displacement of the sealing member. The exact moment when this will occur can be adjusted by turning screw 118 and thereby adjusting the effective length of the actuating rod.

From the foregoing description the operation of my novel heat sealing machine and sealing member will be readily understood by those skilled in the art. When it is desired to operate the machine, a pair of thermoplastic layers 120 and 122 are introduced between sealing member 82 and pressure member 84 and then the reciprocating means (not shown) of the pressure member are actuated. During downward displacement of the pressure member, screw 118 at the end of actuating rod 117 will strike against operating plunger 114 of the time delay switch and will thus initiate operation of the said switch. Preferably this should take place at the time when the sealing member and pressure member are already in their pressure-applying position, or shortly before that time.

Actuation of time delay switch 108 will close the circuit of primary winding 100 of the step-down transformer 98 and, as a result, an alternating current of lower voltage will be induced in secondary winding 96. A heavy current impulse will be caused to flow through heater element 28 and will heat it practically instantaneously to heat sealing temperature. This heat, effective through the thicknesses of heat-resistant Teflon layers 62 and 66, will cause heat sealing of the overlying thermoplastic layers 120, 122 in a corresponding region.

A short period thereafter, time delay switch 108 will automatically open the circuit of the transformer primary 100, thereby de-energizing the heater element. Preferably, pressure is maintained upon the sealed thermoplastic layers for a short period thereafter in order to permit the sealed region to cool and to consolidate under pressure. Finally, the pressure is released and the sealed layers are removed, preparing the machine for the next sealing cycle.

Figure 9:
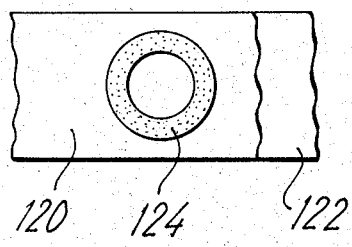
FIG. 9 is a top elevational view of a pair of thermoplastic layers heat sealed together by means of the heater element shown in FIGS. 5-7.

The shape of the seal will faithfully follow the shape of the heater element 28, as this will be readily observed in FIG. 9 in which the seal region is denoted by reference numeral 124. This, of course, is due to the particular structural organization of the heater element and its feeders embodying the invention and to the resulting absence of "hot" or "cold" spots from the said element. Obviously, the principles of the invention are applicable not only to the production of seals of a circular shape but also to seals of other closed shape, such as oval shape, assuming that the said shape is substantially symmetrical with respect to a diagonal axis.

In a typical sealing member embodying the invention, heater element 28 was made of Nichrome sheet 0.004" thick having an outside diameter of 2¼" and an inside diameter 2", so that the width of the circular Nichrome band was ⅛". Feeders 30 were formed of German silver 0.010" and their ears 36 spot welded to the underside of the heater element were 3/32" square. Teflon layers 54 and 56 were 0.006" thick, Teflon layer 62 was 0.003" thick and Teflon layer 66 was 0.006" thick. All of these layers comprised a Fiberglas fabric impregnated with a tetrafluoroethylene polymer.

Although the present invention has been disclosed in connection with a preferred embodiment thereof, variations and modifications may be resorted to by those skilled in the art without departing from the principles of the invention. I consider all of these variations and modifications to be within the true spirit and scope of the present invention, as disclosed in the foregoing description and defined by the appended claims.

What is claimed is:

1. A sealing member for heat sealing machines comprising a base of metal having a plane top surface, a layer of insulation on said surface, a heater element of sheet metal having a closed circular shape, said heater element having its bottom face resting on said layer of insulation and having its top face adapted to apply sealing heat and pressure to a pair of thermoplastic layers, a pair of feeders having one of their ends attached to the bottom face of said heater element at diametrically opposite transverse regions thereof, and a conductor attached to each of the other ends of said feeders for supplying heating current through said feeders to said heater element, said heater element being formed of metal of high specific resistivity, said conductor being formed of metal of low specific resistivity, and said feeders being formed of metal of intermediate resistivity.

2. A sealing member for heat sealing machines according to claim 1, wherein the resistivity of the heater element is similar to that of Nichrome, the resistivity of the feeders is similar to that of German silver, and the resistivity of the conductors is similar to that of copper.

3. A sealing member for heat sealing machines of the thermal impulse type, which comprises a base of metal of high heat conductivity having a plane top surface, a layer of insulation on said surface, a heater element in the form of a metal washer resting on said layer of insulation, a pair of feeders of sheet metal each having a portion at its first end bent into the plane of said washer and attached to the underside of said washer at diametrically opposite transverse regions thereof and each having its second end substantially at right angles to the plane of said washer and extending into diametrically opposite directions, a slot across said base for a depth sufficient to accommodate said feeders with their second ends extending therefrom, and layers of insulation interposed between the walls of said slot and said feeders.

4. A sealing member for heat sealing machines of the thermal impulse type according to claim 3, wherein the portion of the feeders attached to the underside of the washer is less in width than the width of the washer.

5. A sealing member for heat sealing machines of the thermal impulse type according to claim 3, wherein the portion of the feeders bent into the plane of the washer is narrower than the washer and is attached to the washer in such relation that the inner edge of said portion is aligned with the inner edge of the washer whereas the outer edge of such portion is spaced from the outer edge of said washer.

6. A sealing member for heat sealing machines of the thermal impulse type, which comprises a base of metal having a plane top surface, a first layer of insulation on said surface, a second layer of insulation on said first layer of insulation, a heater element in the form of a metal washer resting on said second layer of insulation, a pair of feeders having an ear at one of their ends attached to the underside of said washer at diametrically opposite transverse regions thereof and having their other terminal ends at right angles to the plane of said washer extending away from said washer, slots in said layers of insulation and in said base to accommodate said terminal ends of the feeders, and layers of insulation interposed between the walls of the slots in the metal base and said feeders, said slots in the second layer of insulation terminating in enlarged cutout portions so constructed and arranged as to accommodate the ears of the feeders attached to the underside of said washer.

7. A sealing member for heat sealing machines of the thermal impulse type according to claim 6, wherein the heater element in the form of a metal washer is covered by an additional layer of insulation constituting the operative and sealing face of the member.

8. A sealing member for heat sealing machines of the thermal impulse type according to claim 6, wherein the heater element in the form of a metal washer is covered by at least one additional layer of insulation, said layer of insulation having its marginal regions bent against and secured to the sides of the metal base thereby maintaining the parts of the sealing member in assembled relation.

9. A sealing member for heat sealing machines of the thermal impulse type according to claim 6, wherein a circular aperture is provided in said base and in all of said layers of insulation, said aperture being concentric with and having a diameter smaller than the inner diameter of said washer constituting the heater element.

10. A heat sealing machine comprising a pressure member; a sealing member comprising a heater element having a closed geometric shape and at least one axis of symmetry, and a pair of feeders connected to the underside of said element at diametrically opposite transverse regions thereof; means for reciprocating said members; and means for passing a pulse of current through said heater element by way of said feeders thereby to cause heat sealing of thermoplastic layers interposed between the members in a region corresponding in shape to that of said heater element.

References Cited
UNITED STATES PATENTS
3,133,846  5/1964  Gandy _____ 219—243

FOREIGN PATENTS
300,162  3/1955  Switzerland.

DOUGLAS J. DRUMMOND, *Primary Examiner.*